J. C. MILLER.
ICE CREAM FREEZER.
APPLICATION FILED SEPT. 12, 1903.
915,689.
Patented Mar. 16, 1909.
2 SHEETS—SHEET 1.
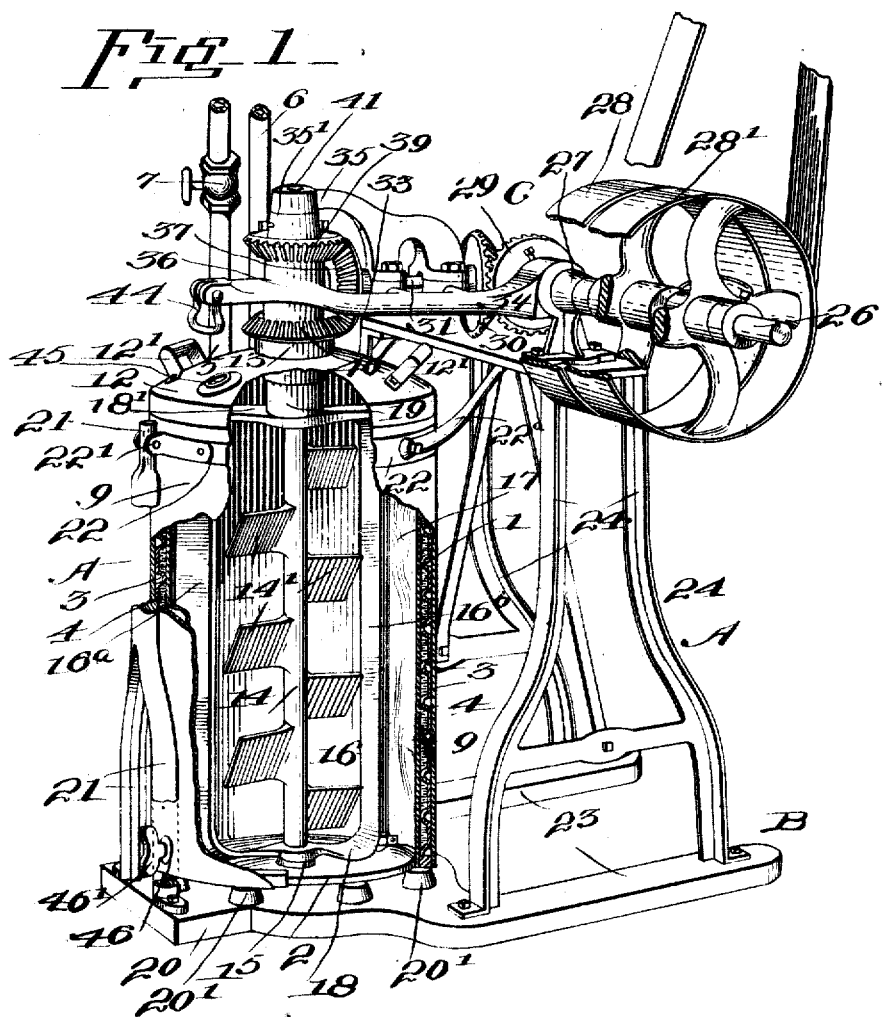
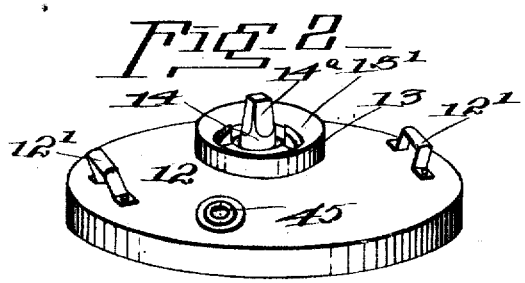
WITNESSES:
INVENTOR
BY
ATTORNEY

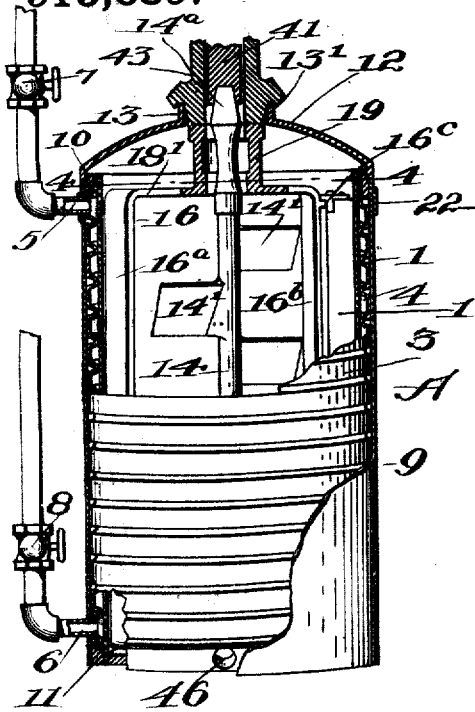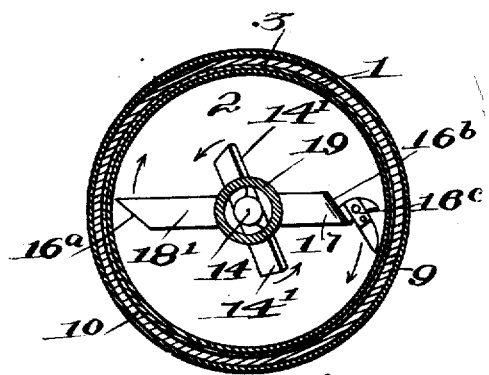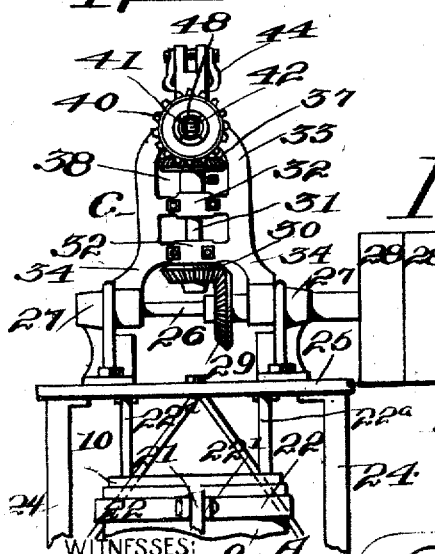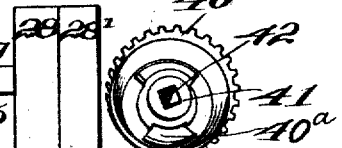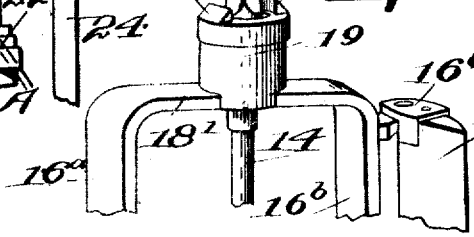

UNITED STATES PATENT OFFICE.

JOHN C. MILLER, OF CANTON, OHIO, ASSIGNOR TO THE MILLER PASTEURIZING MACHINE COMPANY, OF CANTON, OHIO, A CORPORATION OF NEW JERSEY.

ICE-CREAM FREEZER.

No. 915,689.  Specification of Letters Patent.  Patented March 16, 1909.

Application filed September 12, 1903. Serial No. 173,008.

*To all whom it may concern:*

Be it known that I, JOHN C. MILLER, a citizen of the United States, residing at Canton, in the county of Stark and State of Ohio, have invented certain new and useful Improvements in Ice-Cream Freezers, of which the following is a specification, reference being had therein to the accompanying drawing.

This invention relates to improved mechanism for making ice cream or for similar purposes. It has for its object to use a liquid cooling medium, such as brine, and to provide a circulation for the said cooling medium about the liquid to be frozen which will cause rapid and even freezing of the same.

Figure 1 is a perspective view partly in section of a mechanism embodying my invention. Fig. 2 is a perspective view of the top or cover for the freezing cylinder or vessel. Fig. 3 is a side elevation partly in section of the freezing cylinder or vessel detached. Fig. 4 is a section on the line 4—4 of Fig. 3. Figs. 5 and 6 show details. Fig. 7 is a partial front elevation of a freezer showing the power transmitting devices out of operative position.

In the drawings, A represents the freezing cylinder or vessel as an entirety, B the framework supporting the said vessel and the power transmitting devices, and C the power transmitting devices.

The freezing cylinder A preferably consists of an inner cylinder 1 having the bottom wall 2.

3 is a helically grooved or corrugated cylinder snugly incasing the inner cylinder 1. The grooves in the cylinder 3 form with the outer walls of the cylinder 1 a spiral or tortuous passage-way 4 for the cooling medium which extends from the top to the bottom of the freezer. The grooves in the cylinder 3 are preferably relatively wide, as indicated, so that practically the entire external surface of the inner cylinder 1 is exposed to the cooling action of the brine.

5 is an inlet duct leading to the upper end of the brine coil, and 6 is an outlet duct at the bottom of the same. The passage of the brine through this coil may be controlled by the valves 7 and 8 in the said ducts, respectively. I incase the cooling coil or cylinder in an outer casing or jacket 9. This outer casing or jacket serves to brace the brine cylinder or coil, and it is secured in place by the rings or annular plates 10—11 arranged at the top and bottom of the cylinder, respectively.

12 indicates the cover for the cylinder A. It is provided with handles 12' and the flange or ring-shaped projection 13. The latter may be beveled, as shown at 13', to provide a bearing surface for one of the power transmitting gears.

The stirring or agitating device comprises a vertical shaft 14 stepped in a bearing 15 in the bottom wall 2 of the cylinder 1. This shaft preferably carries the stirring blades 14' arranged alternately on the sides thereof.

16 is a stirring and scraping device having its blades or scrapers arranged in planes outside of the blades 14' on the shaft 14 and adapted to rotate independently of the said shaft. This frame 16 has the longitudinal bars 16ª and 16ᵇ, the former being arranged so as to move in proximity to the inner wall of the cylinder 1 and to direct the liquid inwardly. The bar 16ᵇ is arranged closer to the axis of rotation of the frame than the bar 16ª and carries lugs 16ᶜ at either end to which the scraping blade 17 is pivoted. Said blade 17 is preferably made of wood and is adapted to scrape the inner wall of the cylinder 1 and to prevent the caking or freezing of a layer of the liquid to be frozen on the side walls thereof. These longitudinal bars 16ª and 16ᵇ are connected at their lower ends by the transverse bar 18 loosely mounted on the shaft 14. At their upper ends the said bars are connected by the transverse bar 18' which carries the tubular projection 19 having the lugs or jaws 19ª which form one element of the clutch by means of which power is transmitted to rotate the stirrer or scraper. The shaft 14, as shown, extends through this projection 19 and has a squared and tapered end 14ª.

The framework B comprises the large supporting surface 20 having the lugs 20' upon which the freezing cylinder A rests. 21 is a standard secured to the said base. A band or ring 22 encircles the freezing cylinder A near its top and is adapted to be clamped thereto and to hold the cylinder in place on the frame by means of a bolt and nut adapted to bind the eyes 22' at the ends of said band to the upper end of the standard 21. The frame B, furthermore, has the bifurcated supports 23 upon which are secured the standards 24—24 of the frame for supporting the power transmitting devices. 25 is a plate secured to the said standards. 22ª are braces rigidly secured to said plate and to the band or ring 22.

26 is a shaft transversely mounted in bearings 27 rigidly secured to the plate 25. At one end this shaft carries fast and loose pulleys 28—28', respectively, to the former of which power can be applied to rotate the shaft.

29 is a bevel gear rigidly secured to the shaft and adapted to mesh with the bevel gear 30 on the shaft 31, the axis of rotation of which is arranged at right angles to the axis of rotation of the shaft 26. This shaft 31 is mounted in bearings 32 carried by the supplemental frame 33. This frame preferably has the bifurcated arms 34 pivotally mounted on the shaft 26 and the upwardly and forwardly extending arm 35 carrying the bearing 35' arranged in alinement with the bearing 36 at the front end of the frame 33 but above it.

37 is a bevel gear secured to the opposite end of the shaft 31 from the bevel gear 30. The supplemental frame 33 has an opening 38 through which the said gear 37 projects.

39 and 40 are oppositely arranged bevel gears adapted to mesh with the bevel gear 37 and to be driven thereby, one in one direction and the other in the other. The gear 39 is rigidly secured to a vertical shaft 41 mounted at its upper end in the bearing 35 on the pivoted supplemental frame 33. The lower end of the said shaft 41 has the socket 42 with the walls of which the tapered end 14ª of the shaft 14 is adapted to engage. The gear 40 is rigidly secured to a tubular shaft 43 surrounding the said shaft 41, and is itself mounted in the bearing 36 on the supplemental frame 33. This gear carries on its under face the jaws 40ª which are adapted to engage with the jaws 19ª carried by the stirring or scraping frame 16.

44 is a handle arranged at the front end of the supplemental frame and adapted for swinging it into and out of working position.

The operation of the mechanism is as follows: The liquid to be frozen is placed in the inner cylinder 1. The agitating and scraping devices are inserted into the cylinder, the cover is placed in position thereon, and the supplemental frame with the power transmitting devices is then swung down into working position. Power is next applied through the fast pulley and the agitating and scraping devices are set in motion. The brine is then allowed to flow through the cooling coil 3, and the operation of the machine continued until the liquid is frozen.

45 is a peep hole arranged in the cover 13, and having a glass disk inserted therein. This enables the operator to readily see the condition of the contents of the inner vesesl.

46 is a port or outlet duct extending from the inner cylinder through the outer one and adapted to serve in the cleaning or washing out of the inner cylinder. It is normally closed by a plug 46'.

It will be understood that I do not limit myself to the specific construction of apparatus herein described, but that various modifications of this device may be devised without departing from the spirit of my invention.

I believe myself to be the first to have provided a freezer for liquids in which the cooling medium is applied in a continuous stream to the surfaces which are adjacent to the liquid to be frozen.

With an apparatus embodying my invention it is possible to control the flow of brine about the freezing cylinder so as to regulate or vary the time required to accomplish the freezing of the liquid in the freezing cylinder. Rapid freezing can be accomplished by allowing a relatively large amount of the brine to flow around the freezing cylinder. If it is desired to obtain a hard frozen cream, the flow of brine may be partially cut off and the time of freezing or agitating prolonged.

Where the brine is used as a cooling agent and the brine solution is itself cooled by ammonia, the cost of freezing a given quantity of liquid is much less than in the old freezers in which salt and ice are used as the freezing agent, and the even application of the cooling medium to the walls of the freezing cylinder insures that the liquid therein will be evenly frozen. By using brine, furthermore, it is possible to cause the freezing by the use of a lower temperatured freezing agent than when salt and ice are used.

What I claim is:

1. In combination for an ice cream freezer, an inner cylinder having a head at one end thereof, a helically grooved cylinder surrounding said inner cylinder and arranged to form with the outer wall of said inner cylinder a tortuous passageway for the cooling medium, an outer cylinder fitted around the said helically grooved cylinder, a ring closing the annular space between the cylinders at their opposite ends from said head, and a cylinder head carried by said ring and removable at will therefrom.

2. In combination for an ice cream freezer, an inner cylinder having a head at one end thereof, an outer cylinder surrounding the said inner cylinder, means forming a tortuous passageway between the cylinders, one wall of said passageway being constituted by the outer wall of said inner cylinder, a ring closing the annular space between the cylinders at their opposite ends from said head, and a cylinder head carried by said ring and removable therefrom at will.

3. In an ice cream freezer, the combination of an inner cylinder having a head at one end thereof, an outer cylinder surrounding the said inner cylinder, means forming a helical passageway between the cylinders, one wall of said passageway being constituted by the outer wall of said inner cylinder, a ring closing the annular space between the cylinders at their opposite ends from said head, a cylinder head carried by said ring and removable therefrom at will, and an agitating mechanism arranged inside of said inner cylinder and rotatably mounted in said cylinder heads.

In testimony whereof I affix my signature in presence of two witnesses.

JOHN C. MILLER.

Witnesses:
HOMER GIESSEN,
C. GEIDLINGER.